No. 858,806. PATENTED JULY 2, 1907.
G. H. GLAD.
CAR FENDER.
APPLICATION FILED NOV. 12, 1906.

4 SHEETS—SHEET 1.

Witnesses:
Fred Schmmn
Geo Hentz

Inventor:
George Henrie Glad

No. 858,806. PATENTED JULY 2, 1907.
G. H. GLAD.
CAR FENDER.
APPLICATION FILED NOV. 12, 1906.

4 SHEETS—SHEET 2.

Witnesses:
Fred Schmitt
Geo Hentz

Inventor:
George Henrie
Glad.

No. 858,806. PATENTED JULY 2, 1907.
G. H. GLAD.
CAR FENDER.
APPLICATION FILED NOV. 12, 1906.

4 SHEETS—SHEET 3.

Witnesses:
Fred Schumm
Geo. Hentz

Inventor:
George Henzie
Glad

No. 858,806. PATENTED JULY 2, 1907.
G. H. GLAD.
CAR FENDER.
APPLICATION FILED NOV. 12, 1906.

4 SHEETS—SHEET 4.

Witnesses:
Fred Schumm
Geo. Hentz

Inventor:
George Henrie
Glad,

UNITED STATES PATENT OFFICE.

GORGE HENRIE GLAD, OF ST. LOUIS, MISSOURI, ASSIGNOR OF ONE-THIRD TO FRED SCHUMM, OF ST. LOUIS, MISSOURI.

CAR-FENDER.

No. 858,806.   Specification of Letters Patent.   Patented July 2, 1907.

Application filed November 12, 1906. Serial No. 343,154.

*To all whom it may concern:*

Be it known that I, GORGE HENRIE GLAD, a citizen of the United States, residing at St. Louis, State of Missouri, have invented certain new and useful Improvements in Car-Fenders, of which the following is a full, clear, and exact description, reference being had to the accompanying drawings, forming a part thereof.

My invention has relation to improvements in car fenders and consists in the novel construction of fender more fully set forth in the specification and pointed out in the claims.

Figure 1:
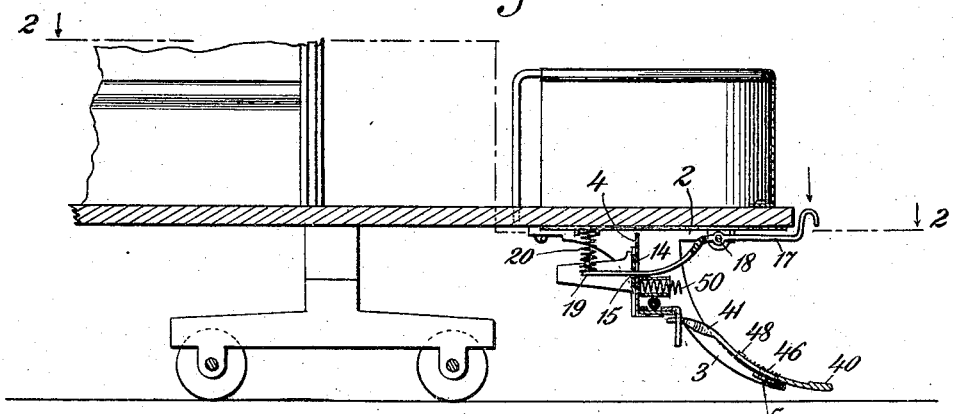
Figure 2:
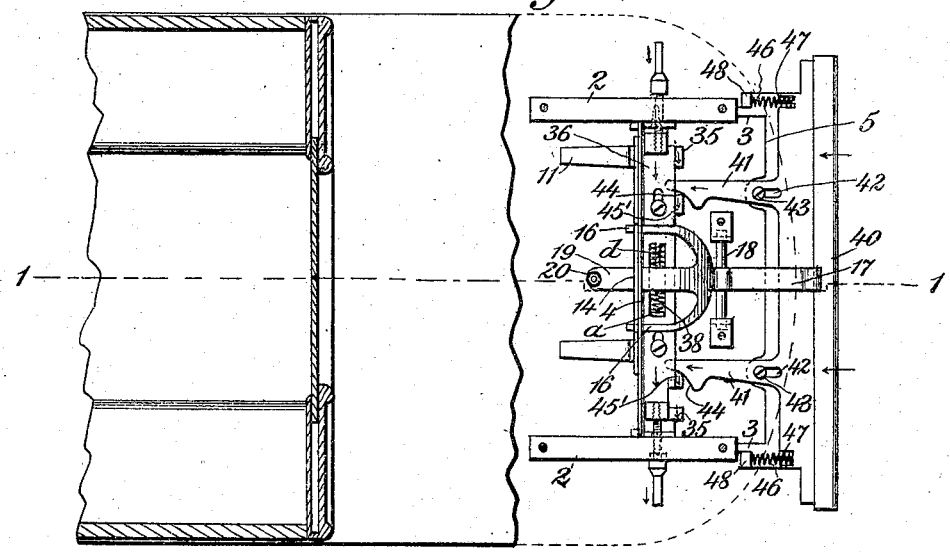
Figure 3:
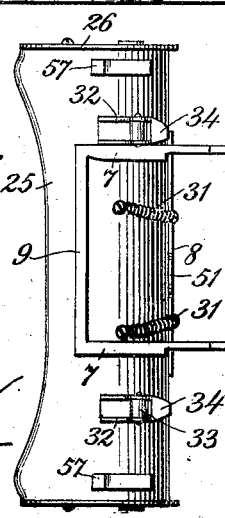
Figure 4:
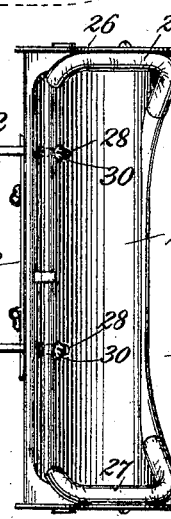
Figure 5:
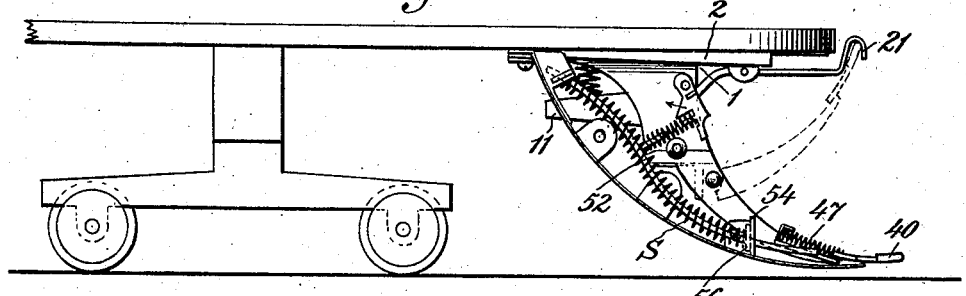
Figure 6:
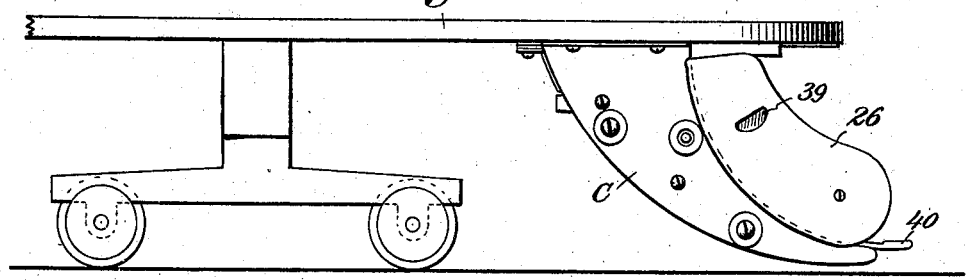
Figure 7:
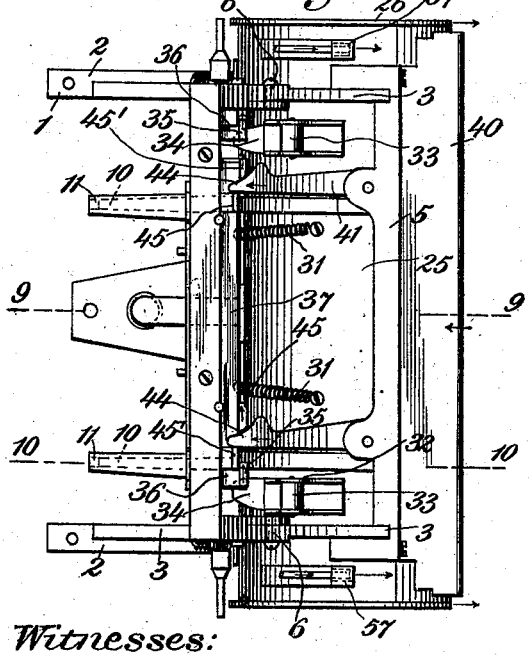
Figure 8:
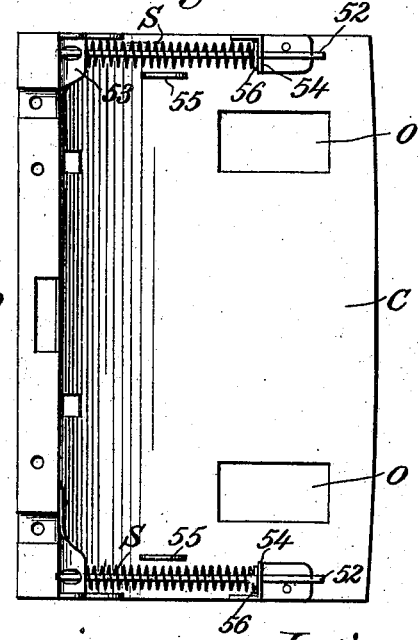
Figure 9:
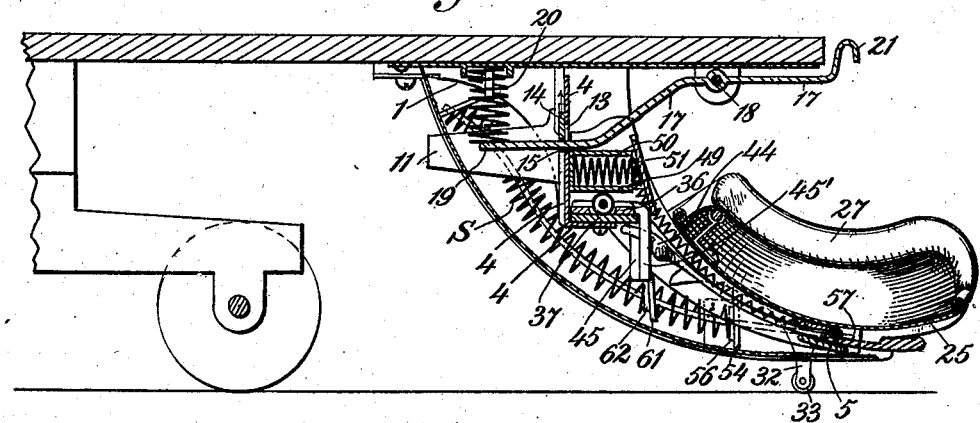
Figure 10:
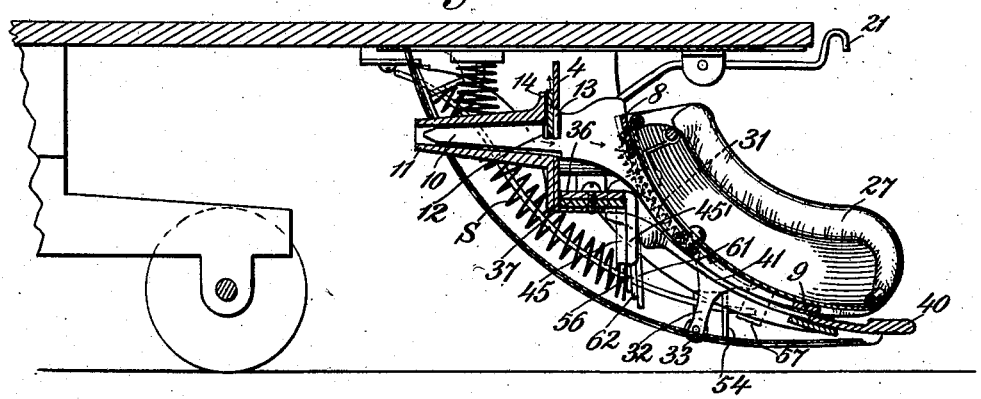
Figure 11:
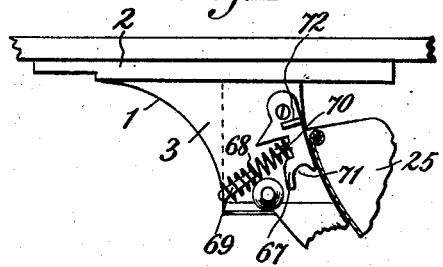
Figure 12:
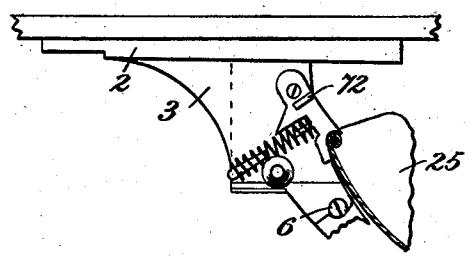
Figure 13:
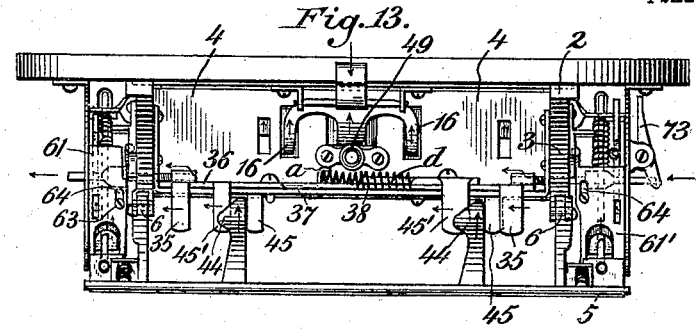
Figure 14:
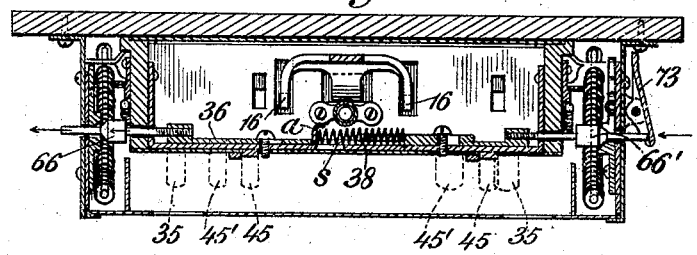
Figure 15:
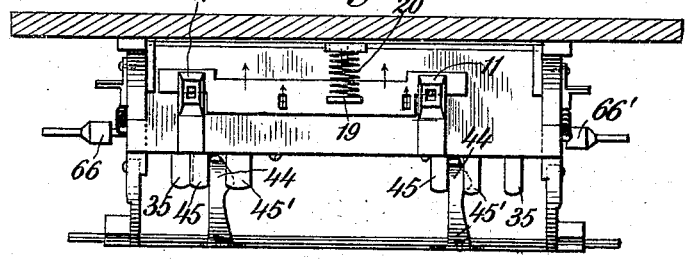
Figures 16, 17:
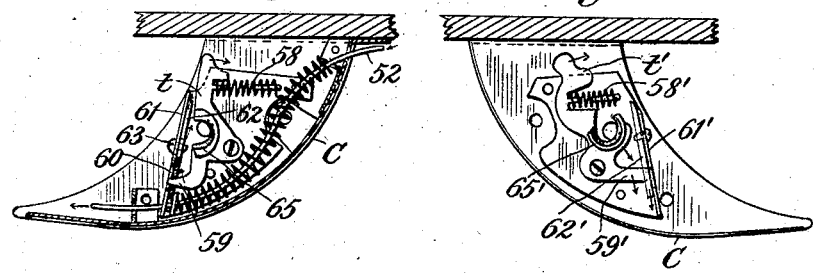

In the drawings, Figure 1 is a longitudinal vertical section taken through the car-body and fender on the line 1—1 of Fig. 2; Fig. 2 is a horizontal section on the broken line 2—2 of Fig. 1; Fig. 3 is a bottom plan view of the cradle and fender frame supporting it; Fig. 4 is a top plan of cradle and fender-frame; Fig. 5 is an end elevation of the fender with cradle and end wall of casing removed; Fig. 6 is an end elevation with cradle in position and end wall of casing in place; Fig. 7 is a bottom plan of fender with outer casing or shell removed; Fig. 8 is a top plan of the casing detached; Fig. 9 is a transverse middle vertical section of fender, with cradle thrust outwardly, being a section on line 9—9 of Fig. 7; Fig. 10 is a transverse section on line 10—10 of Fig. 7 with cradle however in retracted position; Fig. 11 is an end view of the main supporting frame showing the disengaged position of the latch which locks the cradle when the latter has been thrust outwardly; Fig. 12 is a similar view showing the cradle thrust outwardly and locked by the latch; Fig. 13 is a front view of fender with casing and cradle removed; Fig. 14 is a similar view with transversely sliding plate in longitudinal section, and with fender frame removed; Fig. 15 is a rear elevation of Fig. 13, with casing entirely removed; Fig. 16 is an interior face view of one end wall of the casing or shell, and Fig. 17 is an interior face view of the opposite end wall of the casing.

The object of my invention is to construct a fender which will automatically thrust or force outwardly a suitable cradle into which the person or object struck by the car can be safely deposited, the cradle responding with a minimum resistance upon impact of the body with the fender frame on which the cradle is supported, all as will herein more fully appear from a detailed description of the invention which is as follows:

Referring to the drawings, 1 represents a supporting frame or car-bracket provided with arms 2, 2, secured to the car platform, said arms having forwardly and downwardly curved extensions 3, 3, connected respectively by upper and lower plates or members 4, 5, the member 5 being raised above but near the rails on which the car travels. The arm 3 is preferably provided with a hinged joint 6 at an intermediate point to permit the plate 5 to yield upwardly in case it strikes an unyielding obstruction. To the supporting frame 1 (comprising the parts 2, 3, 4, 5 referred to) is removably attached the fender-frame proper on which fender or fender frame is movably supported the cradle presently to be referred to.

The fender is composed of curved arms 7, 7, connected at their upper ends by plate 8, and at their lower ends by plate 9, and composed further of rearwardly projecting arms or pins 10, 10, preferably tapered. The pins 10 enter suitable pockets or sockets 11, 11 carried by the plate 4 of the frame 1. The pins 10 constitute a part of the means whereby the fender-frame is locked to the car-bracket, the remainder of such locking means being as follows: Each arm 10 is provided at its base with a notch or recess 12 which enters the opening 13 in the plate 4 opposite the socket, the base of the top wall of the socket being removed a suitable space from the adjacent face of the plate 4 to allow for the insertion of a longitudinal locking plate 14, this plate falling into the recess 12 of the pin 10 and locking the parts (Fig. 10). The locking plate 14 is provided with suitable openings 15 for the passage therethrough of the forks or arms 16, 16 of a vertically oscillating lever 17 mounted on a pin 18 carried by the car. The rear arm 19 of the lever is engaged by an expanding spring 20 interposed between the arm and car, which tends to depress the arm 19 and consequently the plate 14. The outer terminal of the lever 17 is provided with a hook 21 behind which, the cradle can be held out of engagement when not in commission. The slot 13 of the plate 4 of the car-bracket is of sufficient vertical dimensions to allow of the necessary depression of the lever 17 to raise the plate 14 out of locking position, allowing for the withdrawal of the pins 10, 10, from their sockets 11, and permitting frame and cradle to be tilted out of the way (which is the case of the rear platform of the car where the fender is not needed), and the free edge of the cradle passed behind the hook 21.

The cradle 25 is movably and slidingly mounted on the fender arms 7, 7, and serves to catch a person struck by the fender or rather by the trip-plate thereof presently to be referred to. The cradle comprises a curved or concaved sheet metal bottom or body 25, having end walls 26, 26, protected by cushions 27. The bottom is provided with elongated slots 28 (Fig. 4) immediately over the arms 7, 7, bolts or pins 30 projecting loosely through said slots from said arms, this arrangement permitting the cradle to slide up and down on the arms. Springs 31, are connected at their lower ends to the bottom of the cradle, and at their upper ends to the cross plate 8 of the fender frame, said springs normally contracting and serving to retract the cradle or draw the same toward or into the fender-frame the outward ejection of the cradle upon impact being accomplished by the more powerful springs S to be presently referred to. The cradle is provided with legs 32 having terminal rollers 33, the parts being so proportioned that when the cradle has been thrust outwardly the rollers 33 will travel on the rails and thus support the cradle. To hold the cradle in its retracted or inoperative position, the bottom of the cradle is provided with lugs or projections 34 in line with the legs 32 (Fig. 3) which rest upon and are engaged by the bases or horizontal legs of the angle-pieces or lugs 35 formed on the transversely (transverse to the car) reciprocating or sliding plate or cradle-releasing bar 36. This bar 36 is mounted in suitable guides formed on the stationary plate or member 37 which is supported by and extends forward from the wall or plate 4 of the car-bracket (Figs. 9, 10, 13).

A contracting spring 38 connects the bar or plate 36 with the stationary plate 37 so as to normally hold the lugs 35 in the path of or under the lugs 34 of the cradle, and since the cradle has an oscillating movement, riding on the convexed arms 7, 7, the downward or vertical component of the curve through which the cradle tends to move, naturally bears against the lugs 35 and thus locks the cradle against movement (until thrust outwardly by the spring S after the proper lateral shifting of the plate 36). One end of the spring 38 engages a lip $a$ (Figs. 2, 13, 14) projecting from the plate 37 through the slot $s$ of the reciprocating plate 36, the opposite end encircling a stem $d$ on said reciprocating plate 36. In order that the lugs 34 of the cradle may wedge themselves past the lugs 35 and shove the latter with their plate 36 aside when the lugs 34 are moving upward in the restoration of the cradle to its normal or retracted position, the ends of the vertical legs of such lugs 35 are rounded (Fig. 13). The cradle is provided with handholes 39 for seizing it and raising it to its retracted position.

To release the cradle and permit it to be thrust outwardly and forwardly when the car collides with a person, I provide the following mechanism: A cushioned trip-plate or bar 40 is mounted on the plate 5, the trip-plate being provided with rearward extending arms 41 having slots 42 through which pass pins or bolts 43 (Fig. 2) the latter being secured to the plate 5. The arms 41 are provided with terminal cams or wedges 44 which occupy a position between pairs of downwardly extended fingers 45, 45′, of the stationary and reciprocating plates 37, and 36 respectively, so that when the plate 40 is shoved rearward by reason of impact against a person or object on the track, the cams wedge themselves between the fingers 45, 45′, pushing the fingers 45′ of the movable plate 36 to one side, and hence imparting sufficient lateral reciprocation to said movable plate, and withdrawing the supporting lugs 35 from under the lugs 34 of the cradle. The powerful spring S is now free to thrust the cradle outwardly and downwardly causing it to assume the position as shown in Fig. 9, and catching the individual who happened to be struck by the car. The trip-plate 40 is restored to its normal position by the expanding springs 46 mounted on pins 47 (Fig. 2) of the plate and passing into suitable bearings or lugs 48 on the arms 3, 3. In order to assist detaching the fender-bracket from the car-bracket, the latter is provided with a centrally disposed casing or socket 49 in which is mounted a spring 50 bearing respectively against the base of the socket and the central lobe 51 of the plate 8 of the fender-bracket (Figs. 3, 9), when the parts are assembled. When the plate 14 is raised to release the pins 10, 10, the spring 50 starts the pins out of their sockets.

In the operation of my fender, the parts being assembled, if the trip-plate comes in contact with a person or other obstacle, it will be moved rearwardly against the tension of the springs 46, until the cams 44 have disengaged the lugs 35 from the lugs 34 of the cradle, when the springs S will thrust the cradle into its forward and downward operative position, the cradle thus by its yielding movement tripping the person and catching him with the least amount of injury.

The springs S are mounted at opposite ends of the cover shield or casing C provided with openings O, O, for the passage of the legs 32 referred to. The springs are coiled about bent yielding thrust rods 52 mounted between lugs 53, 54 and between the end wall of the casing and a guard lug 55, one end of the spring bearing against the top lug 53, and the lower end against a collar 56 secured to the rod 52, the latter projecting a suitable distance beyond the guide lug 54 and entering a socket 57 on the bottom of the cradle. The moment the latter is released from its retaining lugs 35 at the moment of impact with a person or other obstacle on the track (by which impact the rear movement of the fender frame slides the plate 36) the springs S thrust the cradle forward so as to catch the person or obstacle. Before the springs S exert their thrust on the cradle thus released, the springs are previously set or held in compression by the following trigger mechanism which in the compression or setting of the springs retracts the rods 52 out of the pockets 57, and which upon release of the parts allows the lower ends of the rods to forcibly impinge themselves against the end walls of the pockets, with the results as previously stated. This trigger or releasing mechanism is as follows: Pivoted on the inside to one of the end walls of the casing C is a trigger or lever $t$ whose long arm is forced or rocked outwardly by an expansion spring 58. The free end of the short or opposite arm of the lever carries a finger 59 which projects through alining openings 60 of a stationary and a movable plate 61, 62 respectively, the movable plate having a sliding connection with the stationary plate by means of a stud or screw 63 on the sliding plate passing through an elongated slot 64 on the stationary plate. Both plates terminate in concave edges freely spanning the rod 52. The trigger is provided with a semi-circular boss 65 having tapering walls adapted to coöperate with and receive the conical head 66 of the sliding plate 36.

It is apparent that as the plate 36 slides toward the trigger $t$, the head 66 will wedge itself past the walls of the conical boss 65, tripping the trigger against the action of the spring 58, the finger 59 under the circumstances raising the plate 62 sufficiently to permit the latter to release the collar or disk 56 and allow the spring S to thrust outwardly the cradle released by impact. The spring S on the opposite side is released by a trigger operating by the withdrawal of the conical head 66′ from the conical or tapering boss 65′ of a trigger $t'$ likewise controlled by a spring 58′, but the terminal finger 59' of whose short arm is on the same side of the trigger as the spring. So that as the head 66' is withdrawn from the hollow boss 65', the spring 58' will rock the trigger so as to lift the movable plate 62' on its stationary plate 61', the stationary plates 61, 61' having the concave ends cut away sufficiently to allow the collars 56 to pass freely through such cut-away portions, as the rods 52 are thrust against the cradle.

When the cradle is retracted its upper edge bears against the longitudinal edge of a spring-latch 67 pivoted to each arm 3 of the frame 1, and forced outwardly by a spring 68 mounted between the lugs 69, 70 of the arm and latch respectively, the free end of the latch being provided with a depression or curved finger 71 which engages the adjacent edge of the cradle and prevents its return to its original retracted position after having once been thrust outward and after having caught the object struck. Each latch is provided with bars or finger holds 72 by which the parts can be reset. The sliding plate 36 can be operated manually by a lever 73 pivoted at the side of the casing C, the short arm of the lever bearing against the adjacent end of the spindle forming an extension of the said sliding plate which is normally forced toward the lever by the contracting spring 38.

Having described my invention what I claim is:

1. In a car fender, a suitable supporting frame, a fender frame locked thereto and superposed thereover, a cradle having a vertically oscillating movement on the fender frame, a laterally reciprocating bar for normally retaining the cradle in a retracted position, and means for shifting the bar and releasing the cradle upon impact with an obstruction placed in the path of the car, substantially as set forth.

2. In a car-fender, a suitable supporting frame, a fender frame locked thereto and superposed thereover, a cradle having a vertical oscillating movement on the fender frame, a laterally reciprocating bar provided with means for retaining the cradle in a retracted position, a trip-plate beneath the cradle, arms secured to the trip-plate for shifting the bar sufficiently to release the cradle, and springs for thrusting the cradle forwardly and downwardly upon its release, substantially as set forth.

3. In a car-fender, a suitable supporting frame, a fender-frame locked thereto and superposed thereon, a cradle having a vertical oscillating movement on the fender-frame, a laterally reciprocating bar, fingers depending therefrom, a stationary plate for supporting said reciprocating bar, fingers on the stationary plate removed a suitable distance from the fingers of the reciprocating bar, a trip-plate below the cradle, arms extending rearwardly from the trip-plate, wedges or cams terminating said arms and entering the spaces between the fingers of the bar and supporting plate, a spring for retracting the reciprocating bar to its normal position, the wedges being adapted to shift the reciprocating bar upon a rearward movement of the trip-plate and release the cradle, and springs for thrusting out the cradle upon its release, substantially as set forth.

4. In a car-fender, a suitable supporting frame, a fender frame locked thereto, a sliding cradle on said frame, a laterally reciprocating bar normally retaining the cradle in a retracted position, spring controlled thrust rods at opposite ends of the fender behind the cradle, lugs or sockets on the cradle for receiving the thrust or impact of the rods upon release of their actuating springs, locking plates for retaining under compression the springs actuating the thrust rods, and triggers disposed in the path of the reciprocating bar and actuated thereby for releasing the springs of said thrust-rods upon release of the cradle, and means for releasing the cradle upon impact of the fender with an object on the track, substantially as set forth.

5. In a car-fender, a suitable supporting frame, a fender frame superposed thereon, pins projecting rearwardly from said fender-frame, recesses or notches in the pins, a plate engaging said notches and bearing against the supporting frame, a spring controlled lever having one end connected to the plate and holding the same in its locking position, and a spring for forcing the fender frame from the supporting frame upon release of the former from the locking plate, substantially as set forth.

6. In a car-fender, the combination of a fender bracket or frame, having forwardly and downwardly curved arms, a cradle slidingly mounted on said arms, springs connecting said frame and cradle, and tending to retract the cradle, lugs on the cradle, a reciprocating plate or bar carried by the car, lugs on the bar adapted to engage the lugs on the cradle, a forwardly and backwardly movable trip-plate normally extending beyond the cradle, cams coupled to the trip-plate, and fingers on the reciprocating bar engaged by the cams whereby the bar is shifted and the lugs on the bar removed from engagement with the lugs on the cradle, and the latter released, substantially as set forth.

In testimony that I claim the foregoing I have hereunto set my hand.

GORGE HENRIE GLAD.

Witnesses:
FRED SCHUMM,
CONRAD ALF.